United States Patent [19]
Benson

[11] 4,129,313
[45] Dec. 12, 1978

[54] SKI DEVICE

[76] Inventor: James L. Benson, 4376 Okemos Rd., Apt. C-101, Okemos, Mich. 48864

[21] Appl. No.: 830,689

[22] Filed: Sep. 6, 1977

[51] Int. Cl.² ............................................. B62B 13/16
[52] U.S. Cl. ................................................. 280/12 H
[58] Field of Search ................ 280/12 R, 12 A, 12 H, 280/12 K

[56] References Cited
U.S. PATENT DOCUMENTS

| | | | |
|---|---|---|---|
| 1,286,217 | 12/1918 | Brandes | 280/12 H |
| 1,330,644 | 2/1920 | Matson | 280/12 H |
| 1,577,078 | 3/1926 | Richards | 280/12 H |

Primary Examiner—Robert R. Song
Attorney, Agent, or Firm—McGarry & Waters

[57] ABSTRACT

A ski device comprises a ski with a substantially rigid combination handle and seat member pivotably mounted on the forward portion of the ski. The member forms a handle for a skier standing upright on the rear portion of the ski when the member is pivoted upwardly from the ski, and the member forms a seat for a skier sitting on the ski when the member is pivoted downwardly into contact with the ski. A foot rest and holding strap are provided for stabilizing the skier while seated on the ski.

7 Claims, 3 Drawing Figures

U.S. Patent
Dec. 12, 1978
4,129,313
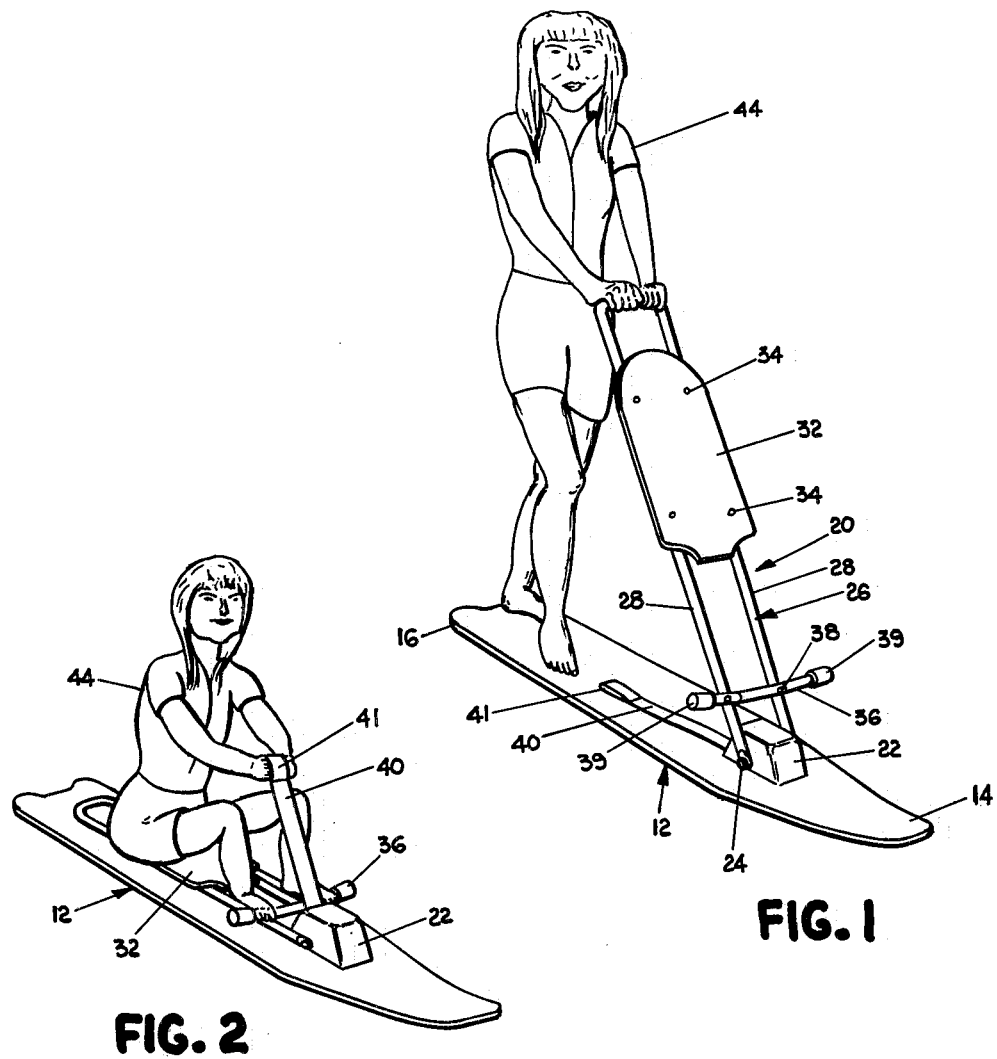
FIG. 1
FIG. 2
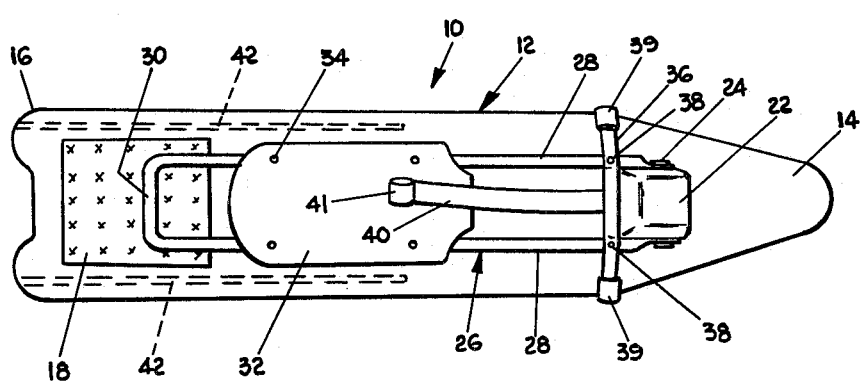
FIG. 3

SKI DEVICE

BACKGROUND OF THE INVENTION

1. Field of the Invention

This invention relates to a ski device and more particularly to a ski device employing a pivotable combination handle and seat member, with the member providing a substantially rigid handle for a skier standing upright on the ski when pivoted upwardly and the member providing a seat for a seated skier when pivoted downwardly into contact with the ski.

2. Description of the Prior Art

Skiing is a popular sport, and a number of devices have been developed that incorporate handles on skis for maintaining the stability of a skier standing on the skies. A few examples of devices of this nature are disclosed in Pangborn, U.S. Pat. No. 1,313,502; Solbjor, U.S. Pat. No. 1,440,565; Philippar, U.S. Pat. No. 2,392,098, and Malmo, U.S. Pat. No. 3,088,748. These devices use, for the most part, flexible straps instead of rigid handles, and straps provide no sideways stabilization. Other ski devices have incorporated seat mechanisms for sitting on the ski. Examples of such constructions are shown in Husak, U.S. Pat. No. 3,190,668; Cohen, U.S. Pat. No. 3,336,038; and Johnston, U.S. Pat. No. 3,744,811.

It is an object of the present invention to provide an improved ski construction that provides both a handle for a standing skier and a seat for a sitting skier with a simple, inexpensive, and stable construction.

SUMMARY OF THE INVENTION

A ski device constructed in accordance with the present invention comprises a ski with a combination handle and seat member pivotably mounted on the ski at a forward portion of the ski. The handle and the seat member are substantially rigid and are pivotably mounted to the ski at a forward end of the member and extend rearwardly therefrom. The member forms a handle for a skier standing upright on a rear portion of the ski when the member is pivoted upwardly from the ski. The member forms a seat for a seat skier sitting on the member and the ski when the member is pivoted downwardly into contact with the ski.

The member includes a substantially rigid handle pivotably attached to the forward portion of the ski for movement in a plane perpendicular to the plane of the ski and parallel to the ski. The member further includes a seat mounted on the handle so as to provide a seat for a skier when the handle is pivoted downwardly into contact with the ski.

The member further comprises a foot rest for a seated skier attached to the forward end of the handle and extending transversely therefrom.

A flexible stabilizer strap is attached to the ski and provides a hand grip for stabilizing a skier while seated on the ski.

Desirably, the handle is formed of a generally U-shaped tubular member having parallel arms that are pivotably mounted on a mounting block at the forward portion of the ski. A hand grip extends across the rearward portion of the arm. The seat is mounted on and extends between the two parallel arms. The foot rest comprises a tubular member mounted between the arms and extending outwardly from each side of the arm. The ski desirably is a generally flat member having an upwardly turned front end and having a pair of parallel longitudinal grooves on the underside thereof.

These and other features of the present invention will hereinafter appear. For purposes of illustration, but not of limitation, a preferred embodiment of the present invention is described in detail below and shown in the appended drawings.

BRIEF DESCRIPTION OF THE DRAWINGS

FIG. 1 is a perspective view of the present invention showing the use of the ski device by a skier standing on the ski in an upward position.

FIG. 2 is a perspective view showing the ski device as it is used by a skier sitting on the ski.

FIG. 3 is a plan view of the ski device of the present invention.

DETAILED DESCRIPTION OF THE PREFERRED EMBODIMENT

Referring now to the drawings, ski device 10 comprises a relatively wide and generally flat ski 12 having a tapered and upwardly turned forward end 14. The body of the ski is somewhat wider at a rear end 16 thereof in order to provide a wide standing space for a skier. The upper surface of the rear portion of the ski is provided with gripping surface 18, formed of an appropriate abrasive or resilient surface so as to assist a skier in standing on the ski.

A combination handle and seat member 20 is pivotably mounted on a forward portion of the ski by means of a mounting block 22 mounted on the forward portion of the ski. Mounting block 22 includes a transverse axle 24 extending through the mounting block and protruding outwardly from each side of the mounting block. Axle 24 can be a conventional bolt.

A handle 26 is pivotably mounted on the portions of axle 24 extending from opposite sides of mounting block 22. Handle 26 comprises a tubular member desirably formed by ½ inch pipe, with the tubular member including parallel arms 28 and a hand grip 30 extending between rearward ends of the arms. The forward ends of the arms are pivotably mounted on the axles, as indicated above.

A seat 32, which could be formed of any appropriate material is mounted on arms 28 toward the rearward portions of the arms. The seat conveniently can be mounted on the arms by means of metal screws 34 or the like.

A foot rest 36 is mounted on the parallel arms at forward portions thereof and extends outwardly from the sides of the arms. The foot rest desirably is formed of ¾ inch pipe or similar material and is attached to the perallel arms by bolts or similar fasteners 38. Caps 39 on the ends of the pipe retain the feet in place on the foot rest. The foot rest also can serve as a handle in the event that the skier wishes to ride the ski on his stomach and hold onto the handle with his hands.

A flexible strap 40 is attached at a forward end to the forward portion of the ski and extends rearwardly to a rearward end adjacent the seat. Desirably, a hand holding loop 41 is formed in the rearward end of the strap. The strap provides a hand grip for stabilizing a skier while he is seated on the ski, in the manner shown in FIG. 2. The flexible strap 40 has the advantage that it provides a stabilizing means for a seated skier but does not interfere with the operation or use of the ski while the skier is standing on the ski with the handle pivoted in an upward direction.

Ski 12 can be formed of wood, fiberglass, or other desirable material. Preferably, the ski is provided with a pair of parallel longitudinal grooves 42 formed on the underside thereof. In a preferred practice of the present invention, the grooves are ⅛ inch deep, ¼ inch wide, and extend 24 inches upwardly toward the front of the ski from the back of the ski. The grooves are approximately one and one-half inches in from each side of the ski. These grooves provide longitudinal stabilization of the ski. The ski desirably is four feet long and ten inches wide.

The operation of the ski device of the present invention is disclosed in FIGS. 1 and 2. In FIG. 1, a skier 44 is standing on gripping surface 18 at the rear of the ski with handle 26 pivoted in an upward direction. The handle is rigid and is mounted on the front of the ski so that vertical movement of the handle is limited to a plane perpendicular to the ski and generally parallel to longitudinal direction of the ski, so maximum sideways stabilization of the skier in an upright position is provided. This type of stabilization is contrasted with the relatively insecure stabilization provided by a flexible strap or other similar type of gripping mechanism disclosed in some of the prior art references discussed above.

When the skier desires to ride the ski in a sitting position, the handle is folded downwardly into contact with the ski in the manner shown in FIG. 2. The skier then sits on the seat 32 and places his feet on foot rest 36. The skier holds onto strap 40 for additional stabilization.

The ski of the present invention is useful for any type of skiing situation. The present ski is lightweight, simple, and inexpensive in construction and provides a wide variety of skiing entertainment for the skier.

It should be understood that the foregoing represents merely a preferred embodiment of the present invention and that various modifications and changes may be made in the arrangements and details of construction of the elements disclosed herein without departing from the spirit and scope of the present invention.

The embodiments of the invention in which an exclusive property or privilege is claimed are defined as follows:

1. A ski device comprising a ski with a combination handle and seat member pivotably mounted on a forward portion of the ski, the handle and seat member being substantially rigid and being pivotably mounted to the ski at a forward end of the member and extending rearwardly therefrom, the member forming a handle for a skier standing upright on a rear portion of the ski when the member is pivoted upwardly from the ski and the member forming a seat for a skier sitting on the member and the ski when the member is pivoted downwardly into contact with the ski, the seat including a seating portion formed on the side of the handle and seat member so as to present a reasonable seating surface on the upper surface of the handle and seat member when the member is pivoted downwardly into contact with the ski.

2. A ski device according to claim 1 wherein the member includes a substantially rigid handle pivotably attached to the forward portion of the ski for movement in a plane that is perpendicular to the plane of the ski and parallel to the longitudinal direction of movement of the ski, the seat being mounted on the side of the handle so as to provide a seat for a skier when the handle is pivoted downwardly into contact with the ski.

3. A ski device according to claim 2 wherein the member further comprises a foot rest for the feet of a seated skier adjacent the forward portion of the handle.

4. A ski device comprising a ski with a combination handle and seat member pivotably mounted on a forward portion of the ski, the handle and seat member being substantially rigid and being pivotably mounted to the ski at a forward end of the member and extending rearwardly therefrom, the member forming a handle for a skier standing upright on a rear portion of the ski when the member is pivoted upwardly from the ski and the member forming a seat for a skier sitting on the member and the ski when the member is pivoted downwardly into contact with the ski, said ski device further comprising hand held stabilizer means for stabilizing the skier while seated on the ski and member, the stabilizer means being formed and mounted on the ski such that it does not interfere with the operation or use of the ski when the skier is riding on the ski in a standing position with the member pivoted upwardly as a handle.

5. A ski device according to claim 4 wherein the stabilizer means is a flexible strap attached at a forward end to the forward portion of the ski and extending rearwardly therefrom to a rearward end that can be held by a seated skier for stabilization purposes.

6. A ski device comprising:
   a generally flat, elongated ski with an upward turned tip at a front end thereof, the ski including foot gripping surface means on the top of the ski at a rearward portion thereof, the ski further including at least two longitudinal grooves extending at least a portion of the way forward on the underside of the ski from the back thereof, the grooves being spaced apart and positioned adjacent the outer edges of the ski;
   a mounting block attached to the ski at a forward portion of the ski, the mounting block including a transverse axle bolt attached to the mounting block and protruding outwardly on each side of the mounting block;
   a generally U-shaped tubular handle pivotably mounted on the mounting block for movement in a vertical plane perpendicular to the plane of the ski and parallel to the longitudinal direction of the ski, the handle comprising a pair of parallel arms extending along the ski and pivotably attached at forward ends to the portions of the axle extending out of the opposite sides of the mounting block, a hand gripping member extending between rearward ends of the parallel arms;
   a seat mounted on the parallel arms and extending between the arms, the seat being formed and positioned so as to provide a seat for a skier on top of the handle when it is pivoted downwardly into contact with the ski;
   a foot rest attached to the forward portion of the handle, the foot rest comprising a tubular member mounted transversely on the parallel arms and extending outwardly from each side of the arms, the outwardly extending portions providing a foot rest for a seated skier; and
   a stabilizing flexible strap attached at one end thereof in a fixed position with respect to a forward portion of the ski and extending rearwardly therefrom, the strap providing a hand grip for stabilizing the skier while seated on the ski.

7. A ski device comprising a ski and a combination handle and seat member pivotably mounted on a forward portion of the ski for movement in a plane perpendicular to the plane of the ski, the handle comprising a pair of parallel arms pivotably mounted at forward ends thereof on opposite sides of a mounting block that is in turn attached to a forward portion of the ski, the arms being attached to the mounting block by an axle attached to the mounting block and protruding outwardly from opposite sides of the mounting block, the seat extending between and being mounted on top of the arms at rearward portions thereof, the ski device further comprising a foot rest for supporting the feet of a seated skier, the foot rest comprising a transverse rod attached to the two arms adjacent the front portions thereof, a hand grip for an upright skier extending between the arms at the rearward end thereof.

* * * * *